United States Patent
Ho

(10) Patent No.: US 11,002,403 B1
(45) Date of Patent: May 11, 2021

(54) CONTROL DEVICE FOR PIVOTAL SUPPORTING SYSTEM

(71) Applicant: Oxti Corporation, Taipei (TW)

(72) Inventor: Chih Feng Ho, Taipei (TW)

(73) Assignee: OXTI CORPORATION, Taipei (TW)

( * ) Notice: Subject to any disclaimer, the term of this patent is extended or adjusted under 35 U.S.C. 154(b) by 0 days.

(21) Appl. No.: 16/808,473

(22) Filed: Mar. 4, 2020

(51) Int. Cl.
*F16M 11/08* (2006.01)

(52) U.S. Cl.
CPC ....... *F16M 11/08* (2013.01); *F16M 2200/021* (2013.01); *F16M 2200/066* (2013.01)

(58) Field of Classification Search
CPC ............. F16M 11/08; F16M 2200/021; F16M 2200/066; F16M 11/16; F16M 11/10; F16M 11/105; F16M 11/2007; F16M 11/2014; F16M 11/2035; F16M 2200/022; F16C 11/04; F16B 7/042; F16B 9/02; F16B 9/026; F16B 9/09; F16B 9/054
See application file for complete search history.

(56) References Cited

U.S. PATENT DOCUMENTS

| | | | | |
|---|---|---|---|---|
| 134,519 | A * | 1/1873 | Cox | F16C 11/04 403/162 |
| 4,392,759 | A * | 7/1983 | Cook | F16D 1/116 403/11 |
| 4,912,809 | A * | 4/1990 | Scheuer | F16B 9/056 16/413 |
| 6,012,693 | A | 1/2000 | Voeller et al. | |
| 6,315,259 | B1 | 11/2001 | Kolb | |
| 6,394,403 | B1 | 5/2002 | Hung | |
| 6,478,275 | B1 | 11/2002 | Huang | |
| 6,769,657 | B1 | 8/2004 | Huang | |
| 6,822,857 | B2 | 11/2004 | Jung et al. | |
| 6,863,252 | B2 | 3/2005 | Bosson | |
| 7,413,152 | B1 | 8/2008 | Chen | |
| 2007/0295878 | A1 * | 12/2007 | Smed | F16M 11/2014 248/413 |
| 2009/0213596 | A1 * | 8/2009 | Gull | F16M 13/027 362/382 |
| 2011/0315843 | A1 * | 12/2011 | Hung | F16M 11/041 248/279.1 |
| 2012/0025037 | A1 * | 2/2012 | Chang | F16M 11/2014 248/124.1 |
| 2015/0176753 | A1 * | 6/2015 | Esterbauer | F21S 8/06 248/176.3 |
| 2017/0150817 | A1 * | 6/2017 | Hung | A47B 97/001 |
| 2017/0261030 | A1 * | 9/2017 | Hung | F16M 11/2014 |

* cited by examiner

*Primary Examiner* — Christopher Garft

(74) *Attorney, Agent, or Firm* — Browdy and Neimark, PLLC

(57) ABSTRACT

A pivotal supporting system includes a pivotal supporting device disposed on a supporting base for supporting a remote member on the supporting base, the pivotal supporting device includes a housing having a compartment for engaging with a shank, the shank having a groove and a pathway aligned with an orifice and an aperture of the housing, a latch engaged into the orifice of the housing for engaging with the groove of the shank, a lock engaged into the aperture of the housing for engaging with the pathway of the shank, and a control ferrule is engaged onto the housing includes an actuating element and one or more actuating members for engaging with the latch and the lock.

6 Claims, 7 Drawing Sheets

CONTROL DEVICE FOR PIVOTAL SUPPORTING SYSTEM

BACKGROUND OF THE INVENTION

1. Field of the Invention

The present invention relates to a pivotal supporting device for a remote member, such as a monitor, displayer, portable phone, television, keyboard, or the like, and more particularly to a pivotal supporting device including an adjustable control structure or configuration for adjusting and/or limiting the pivotal movement of the remote member and the pivotal supporting device relative to the supporting base.

2. Description of the Prior Art

Various kinds of typical supporting devices or apparatuses have been developed and provided for supporting a remote member, such as a monitor, displayer, portable phone, television, keyboard, or the like.

For example, U.S. Pat. No. 6,012,693 to Voeller et al., U.S. Pat. No. 6,315,259 B1 to Kolb, U.S. Pat. No. 6,394,403 B1 to Hung, U.S. Pat. No. 6,478,275 B1 to Huang, U.S. Pat. No. 6,769,657 B1 to Huang, U.S. Pat. No. 6,822,857 B2 to Jung et al., U.S. Pat. No. 6,863,252 B2 to Bosson, and U.S. Pat. No. 7,413,152 B1 to Chen disclose several of the typical supporting devices or apparatuses for supporting a remote member.

However, the typical supporting devices normally comprise a structure or configuration that may not be adjusted and/or limited to pivot relative to the supporting base.

The present invention has arisen to mitigate and/or obviate the afore-described disadvantages of the conventional pivotal supporting devices.

SUMMARY OF THE INVENTION

The primary objective of the present invention is to provide a pivotal supporting device including an adjustable control structure or configuration for adjusting and/or limiting the pivotal movement of the remote member and the pivotal supporting device relative to the supporting base.

In accordance with one aspect of the invention, there is provided a pivotal supporting system comprising a supporting base, and a pivotal supporting device disposed on the supporting base for supporting a remote member on the supporting base, the pivotal supporting device including a housing engaged onto the supporting base, the housing including a compartment formed in the housing, and an orifice and an aperture formed in the housing and communicating with the compartment of the housing, a shank engaged into the compartment of the housing, and the shank including a groove and a pathway formed in the shank and aligned with the orifice and the aperture of the housing respectively, the groove of the shank including an arc length different from an arc length of the pathway of the shank, a latch engaged into the orifice of the housing for engaging with the groove of the shank, a lock engaged into the aperture of the housing for engaging with the pathway of the shank, and a control ferrule rotatably engaged onto the housing, and the control ferrule including an actuating element for engaging with the latch and for forcing the latch to engage with the groove of the shank, and the control ferrule including a first actuating member for engaging with the lock and for forcing the lock to engage with the pathway of the shank.

The control ferrule includes a follower engaged in the control ferrule and rotated in concert with the control ferrule relative to the housing, the follower includes a depression and a recess formed in the follower, and the actuating element is formed in the depression of the follower, and the first and the second actuating members are formed in the recess of the follower.

The depression and the recess of the follower include a first end portion having a depth for receiving and engaging with the latch and the lock respectively and for allowing the latch and the lock to be disengaged from the groove and the pathway of the shank. The depression and the recess of the follower include a middle portion, the first actuating member is formed in the middle portion of the recess of the follower.

The depression and the recess of the follower include a second end portion, the actuating element is formed in the second end portion of the depression of the follower. The follower includes a second actuating member formed in the second end portion of the recess of the follower.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
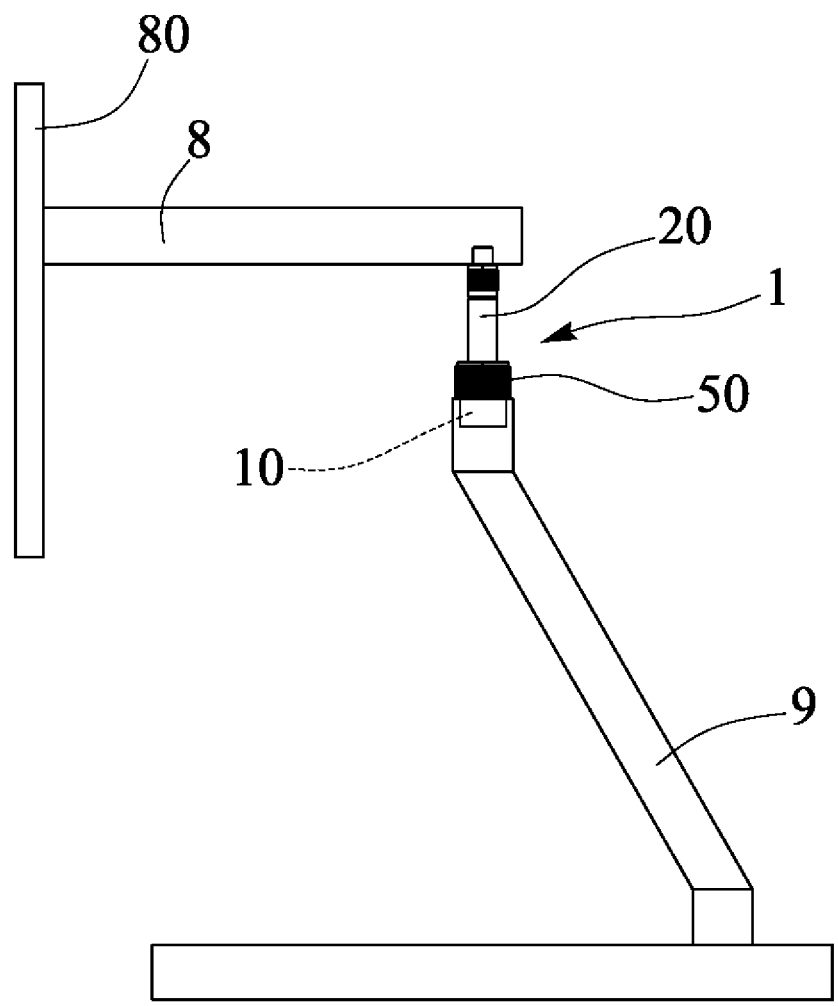
FIG. 1 is a plan schematic view illustrating the operation of the pivotal supporting device in accordance with the present invention for a pivotal supporting system.
Figure 2:
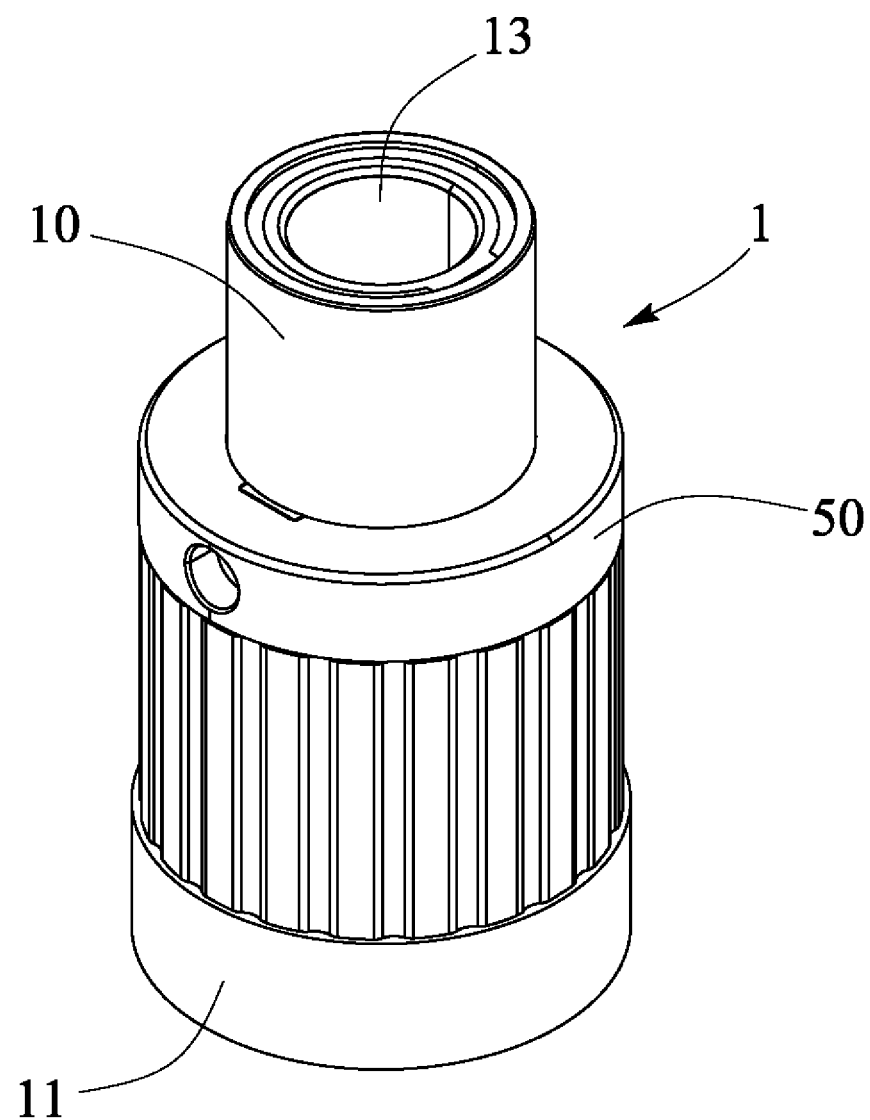
FIG. 2 is a partial perspective view of the pivotal supporting device.

Referring to the drawings, and initially to FIG. 1, a pivotal supporting system in accordance with the present invention comprises a pivotal supporting device 1 to be provided or disposed or engaged onto a supporting stand or a supporting base 9 for pivotally supporting a supporting lever or arm 8 and/or a remote member 80, such as a monitor, displayer, portable phone, television, keyboard, or the like.

As shown in FIGS. 2-5, the pivotal supporting device 1 includes a tubular or cylindrical member or housing 10 to be disposed or engaged or secured onto the supporting base 9, the housing 10 includes an enlarged annular or peripheral swelling or flange 11 extended radially and outwardly therefrom for forming or defining an annular or peripheral shoulder 12 therein and formed or defined between the housing 10 and the peripheral flange 11, and includes a chamber or compartment 13 formed therein for selectively receiving or engaging with a stem or shank 20 which is engageable into the compartment 13 of the housing 10 for engaging with the supporting arm 8 and/or the remote member 80.

It is preferable, but not necessary that the housing 10 includes an annular or peripheral bulge or swelling 15 extended radially and inwardly into the compartment 13 of the housing 10 at the lower or bottom portion 14 of the housing 10 for forming or defining an opening 16 and for forming or defining another annular or peripheral shoulder 17 therein and for engaging with the shank 20 and for solidly and stably anchoring or retaining or positioning the shank 20 in the compartment 13 of the housing 10 and for preventing the shank 20 from being disengaged or separated from the housing 10.

The housing 10 includes an orifice 18 and an aperture 19 formed therein and communicating with the compartment 13 of the housing 10, it is preferable, but not necessary that the orifice 18 is arranged or located close to or above the aperture 19 of the housing 10, for selectively receiving or engaging with a latch 30 and a catch or lock 31 respectively and selectively. A spring biasing member 32, 33 is provided and engaged onto the latch 30 and the lock 31 respectively and engaged between the housing 10 and the latch 30 and the lock 31 respectively (FIGS. 5-7) for biasing and forcing or moving the latch 30 and the lock 31 out of the housing 10 (FIG. 5) selectively.

The shank 20 includes one or more (such as two) grooves or pathways 21, 22 formed therein, such as a groove 21 and a pathway 22 formed therein, and aligned with the orifice 18 and the aperture 19 of the housing 10 respectively, when the shank 20 is engaged into the compartment 13 of the housing 10, for selectively receiving or engaging with the latch 30 and the lock 31 respectively (FIGS. 6-7), in which the groove 21 and the pathway 22 of the shank 20 include arc lengths different from each other for selectively receiving or engaging with the latch 30 and the lock 31 respectively and for guiding and limiting the shank 20 to pivot or rotate relative to the housing 10.

Figure 3:
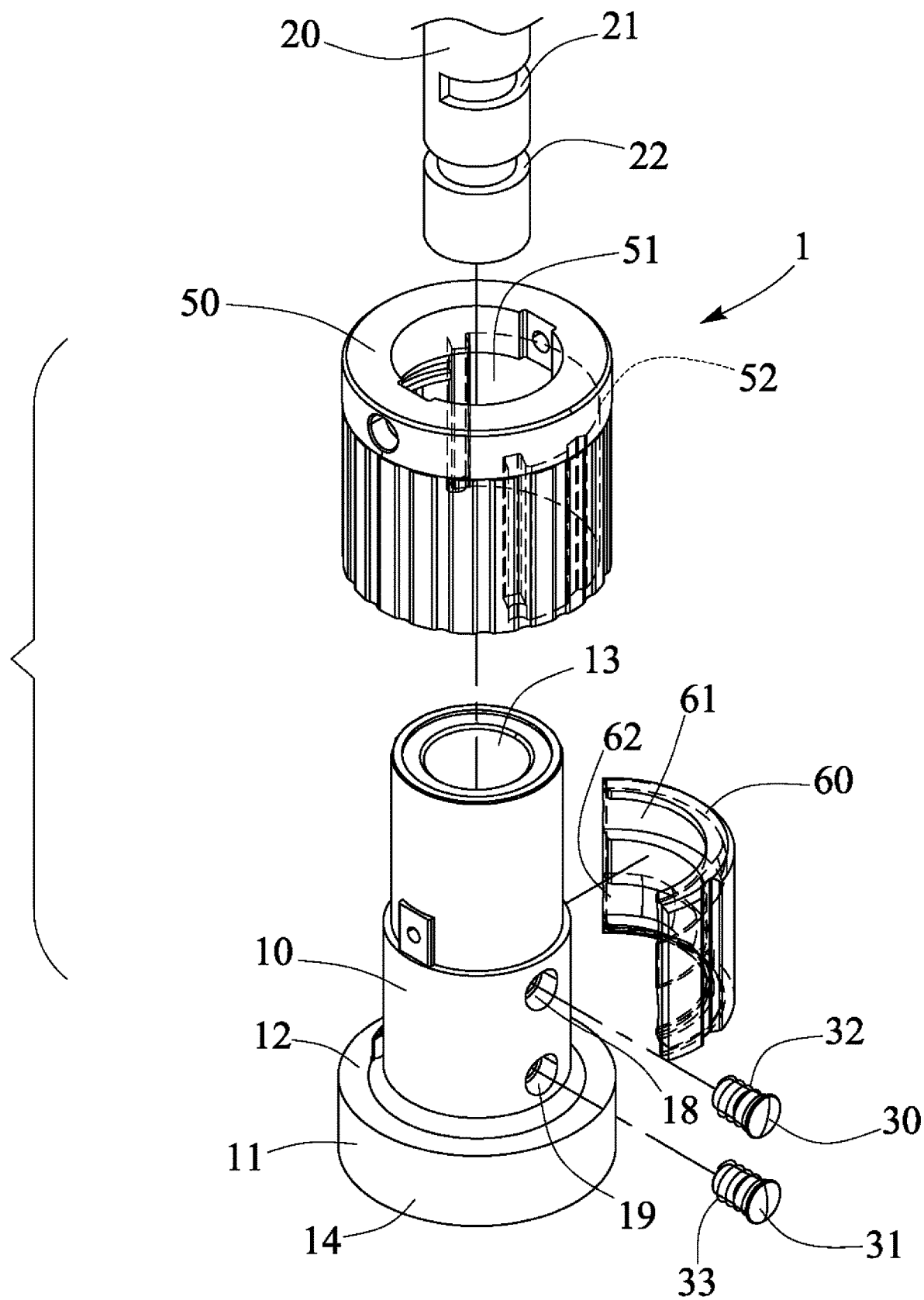
FIG. 3 is a partial exploded view of the pivotal supporting device.
Figure 6:
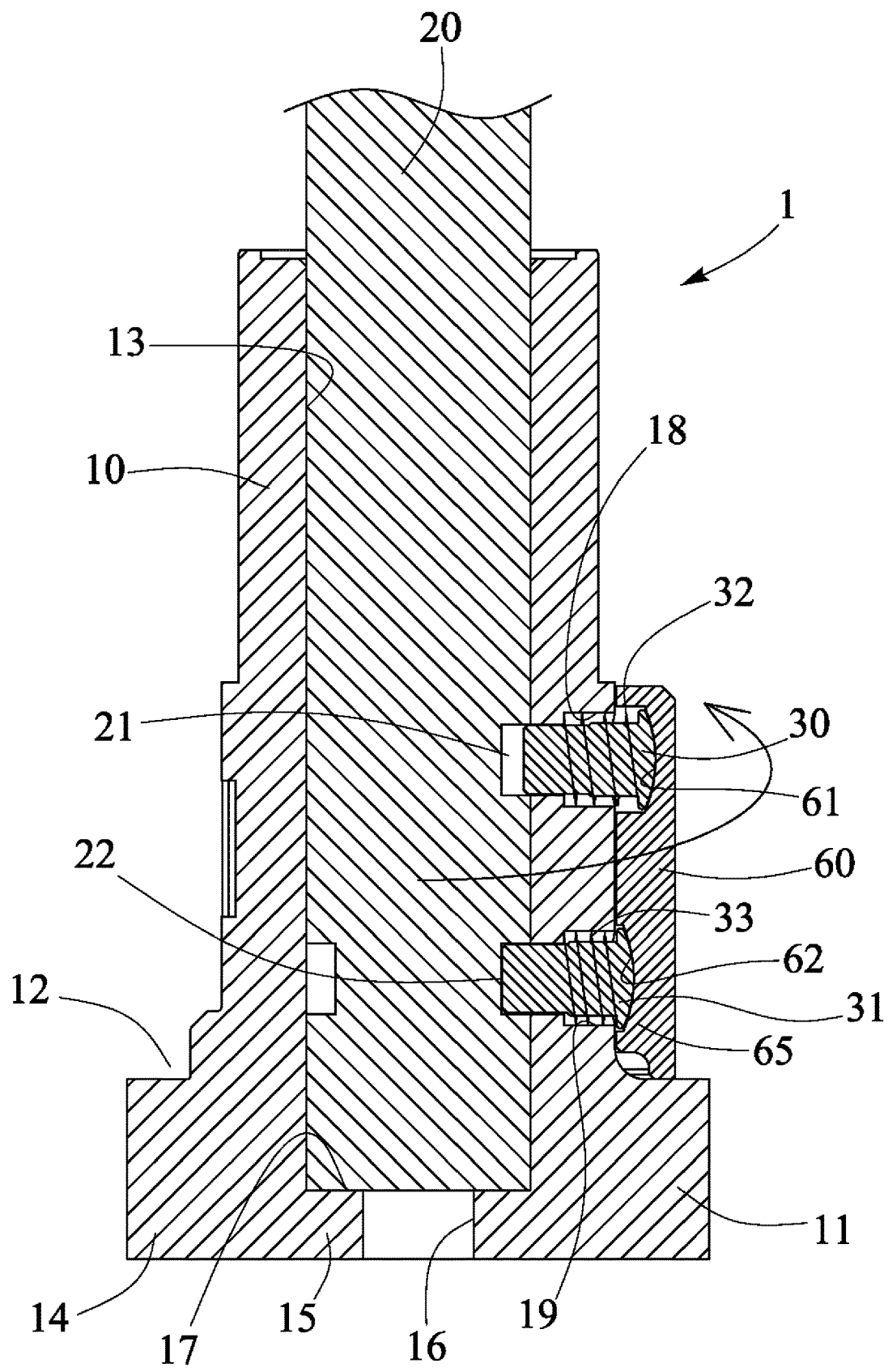
FIGS. 6, 7 are partial cross sectional views of the pivotal supporting device similar to FIG. 5, illustrating the operation of the pivotal supporting device.
Figure 7:
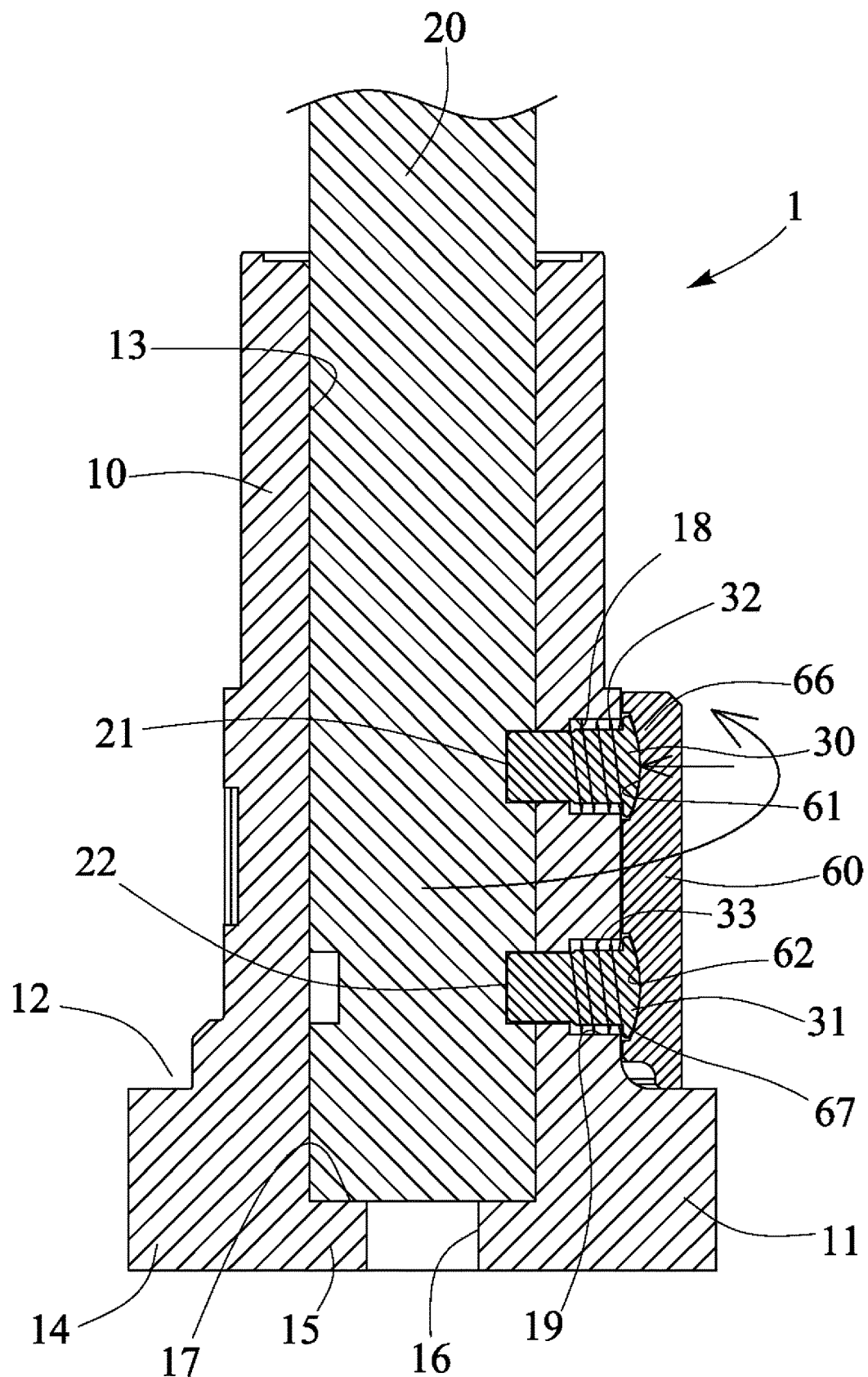

For example, as shown in FIG. 3, the groove 21 of the shank 20 includes an arc length of about one half of the outer peripheral portion of the shank 20 and is smaller than the pathway 22 of the shank 20 which includes an arc length equals to the outer peripheral portion of the shank 20. In operation, as shown in FIG. 7, when the latch 30 is engaged with the groove 21 of the shank 20, the shank 20 is guided or limited to pivot or rotate relative to the housing 10 for about one half of the circle of the housing 10. As shown in FIG. 6, when the lock 31 is engaged with the pathway 22 of the shank 20, the shank 20 is freely rotateable relative to the housing 10, but at this moment, the shank 20 is anchored to the housing 10 with the lock 31 and may not be disengaged or separated or removed from the housing 10.

A control sleeve or ferrule 50 is pivotally or rotatably engaged onto the housing 10, and includes a compartment or chamber 51 formed therein for receiving or engaging with the housing 10, and includes a compartment or space 52 formed therein for receiving or engaging with an actuating member or follower 60 and arranged for allowing the follower 60 to be pivoted or rotated relative to the housing 10 together with and by the control ferrule 50. The follower 60 includes two slots or a depression 61 and a recess 62 formed therein, and aligned with the orifice 18 and the aperture 19 of the housing 10 and/or aligned with the latch 30 and the lock 31 respectively for receiving or engaging with the latch 30 and the lock 31 respectively.

The depression 61 and the recess 62 of the follower 60 include a first end portion 63 having a selected or suitable depth for receiving or engaging with the latch 30 and the lock 31 respectively (FIGS. 4, 5) and arranged for allowing the latch 30 and the lock 31 to be disengaged or separated or offset from the groove 21 and the pathway 22 of the shank 20, and arranged for allowing the shank 20 to be pivoted or rotated relative to the housing 10 freely and also for allowing the shank 20 to be disengaged or separated or removed from the housing 10. The middle or intermediate portion 64 of the depression 61 of the follower 60 also include a selected or suitable depth for receiving or engaging with the latch 30 and for allowing the latch 30 to be disengaged or separated or offset from the groove 21 of the shank 20 (FIGS. 4, 6).

Figure 4:
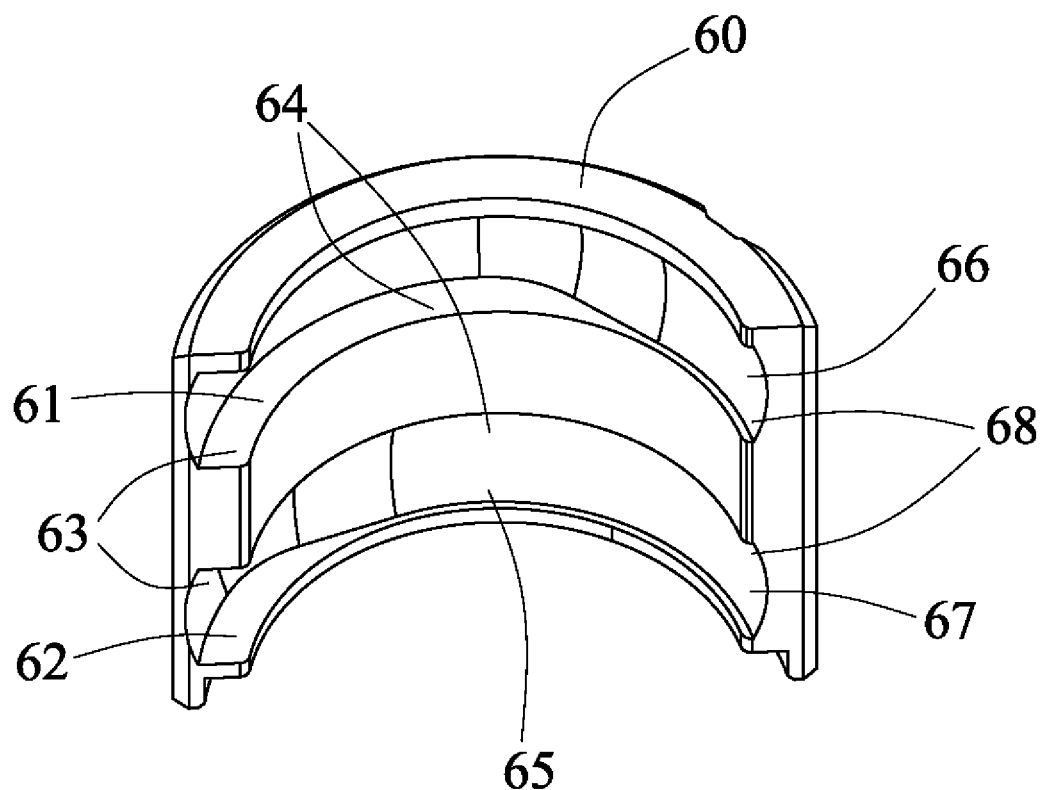
FIG. 4 is another partial perspective view of the pivotal supporting device illustrating a control member or follower of the pivotal supporting device.
Figure 5:
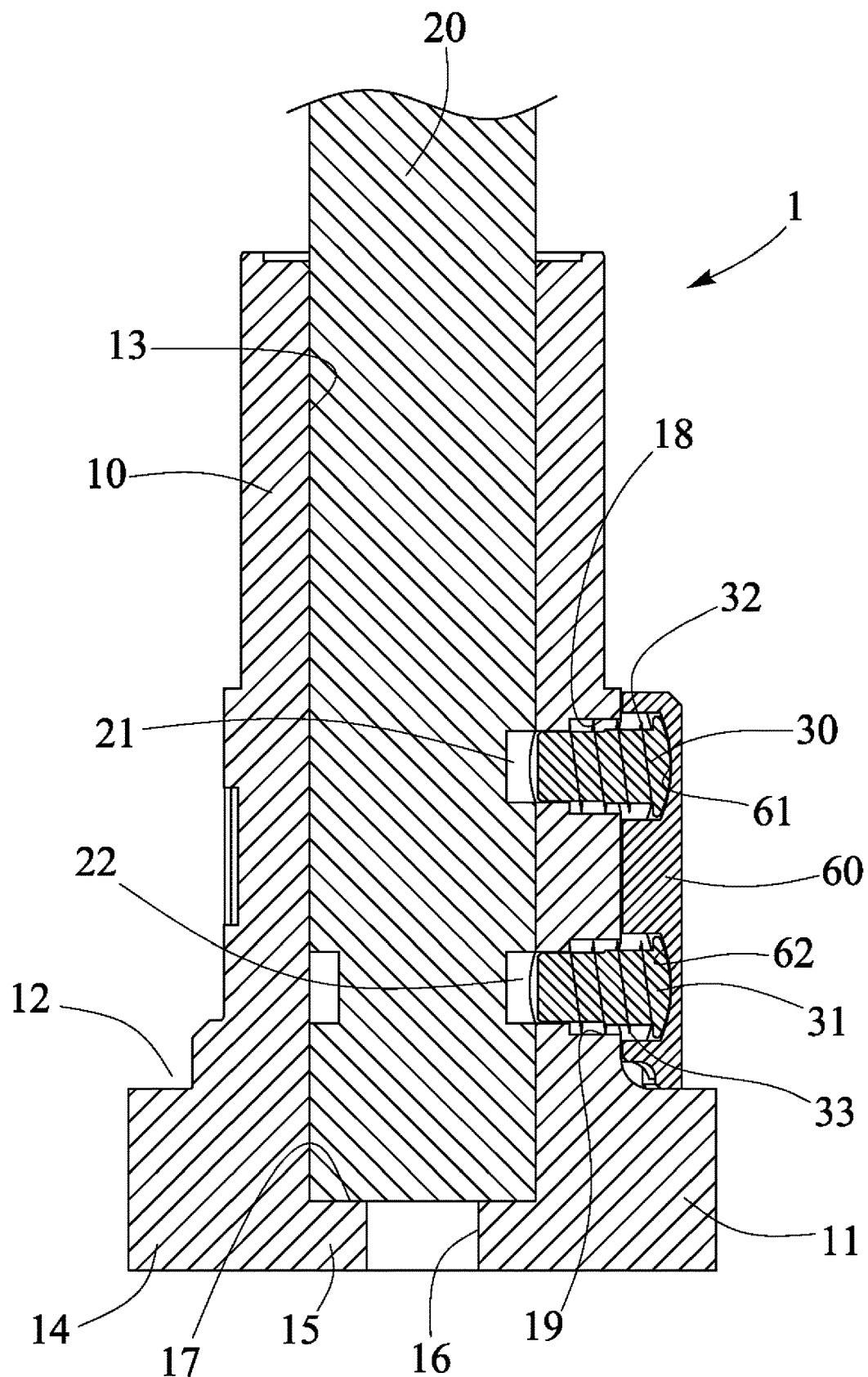
FIG. 5 is a partial cross sectional view of the pivotal supporting device.

However, as also shown in FIGS. 4 and 6, the follower 60 include a first cam or actuating member 65 formed or provided in the middle or intermediate portion 64 of the recess 62 of the follower 60 for engaging with the lock 31 and for actuating or forcing the lock 31 to engage into the pathway 22 of the shank 20 and for anchoring or retaining or positioning the shank 20 to the housing 10 and arranged for allowing the shank 20 to be pivoted or rotated relative to the housing 10 freely, and for preventing the shank 20 from being disengaged or separated or removed from the housing 10 at this moment.

As shown in FIGS. 4 and 7, the follower 60 include a cam or actuating element 66 and a second cam or actuating member 67 formed or provided in the other or second end portion 68 of the depression 61 and the recess 62 of the follower 60 for engaging with the latch 30 and the lock 31 respectively and for actuating or forcing the latch 30 and the lock 31 to engage into the groove 21 and the pathway 22 of the shank 20 respectively and for guiding or limiting the shank 20 to pivot or rotate relative to the housing 10 for about one half of the circle of the housing 10.

In operation, when the control ferrule 50 is pivoted or rotated relative to the housing 10 to align the first end portions 63 of the depression 61 and the recess 62 of the follower 60 with the latch 30 and the lock 31 respectively (FIG. 5), the latch 30 and the lock 31 may be disengaged or separated or offset from the groove 21 and the pathway 22 of the shank 20, and the shank 20 may be pivoted or rotated relative to the housing 10 freely and may also be disengaged or separated or removed from the housing 10 when required.

As shown in FIG. 6, when the control ferrule 50 is pivoted or rotated relative to the housing 10 to align the middle portion 64 of the depression 61 and the recess 62 of the follower 60, the first actuating member 65 may engaging with the lock 31 and may actuate or force the lock 31 to engage into the pathway 22 of the shank 20 and to anchor or retain or position the shank 20 to the housing 10 and arranged for allowing the shank 20 to be pivoted or rotated relative to the housing 10 freely, and may prevent the shank 20 from being disengaged or separated or removed from the housing 10 at this moment.

As shown in FIG. 7, when the second end portions 68 of the groove 21 and the pathway 22 of the shank 20 are aligned with the latch 30 and the lock 31 respectively, both the latch 30 and the lock 31 may be actuated or forced to engage into the groove 21 and the pathway 22 of the shank 20 respectively, at this moment, the shank 20 may be guided or limited to pivot or rotate relative to the housing 10 for about one half of the circle of the housing 10, and may not be disengaged or separated or removed from the housing 10 at this moment. The follower 60 may be welded to or formed integral with the control ferrule 50 or formed as one integral part of the control ferrule 50.

Accordingly, the pivotal supporting device in accordance with the present invention includes an adjustable control structure or configuration for adjusting and/or limiting the pivotal movement of the remote member and the pivotal supporting device relative to the supporting base.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A pivotal supporting system comprising:
   a supporting base, and
   a pivotal supporting device disposed on said supporting base for supporting a remote member on said supporting base, said pivotal supporting device including:
   a housing engaged onto said supporting base, said housing including a compartment formed in said housing, and an orifice and an aperture formed in said housing and communicating with said compartment of said housing,
   a shank engaged into said compartment of said housing, and said shank including a groove and a pathway formed in said shank and aligned with said orifice and said aperture of said housing respectively, said groove of said shank including an arc length different from an arc length of said pathway of said shank,
   a latch engaged into said orifice of said housing for engaging with said groove of said shank,
   a lock engaged into said aperture of said housing for engaging with said pathway of said shank, and
   a control ferrule rotatably engaged onto said housing, and said control ferrule including an actuating element for engaging with said latch and for forcing said latch to engage with said groove of said shank, and said control ferrule including a first actuating member for engaging with said lock and for forcing said lock to engage with said pathway of said shank.

2. The pivotal supporting system as claimed in claim 1, wherein said control ferrule includes a follower engaged in said control ferrule and rotated in concert with said control ferrule relative to said housing, said follower includes a depression and a recess formed in said follower, and said actuating element is formed in said depression of said follower, and said first actuating member is formed in said recess of said follower.

3. The pivotal supporting system as claimed in claim 2, wherein said depression and said recess of said follower include a first end portion having a depth for receiving and engaging with said latch and said lock respectively and for allowing said latch and said lock to be disengaged from said groove and said pathway of said shank.

4. The pivotal supporting system as claimed in claim 3, wherein said depression and said recess of said follower include a middle portion, said first actuating member is formed in said middle portion of said recess of said follower.

5. The pivotal supporting system as claimed in claim 3, wherein said depression and said recess of said follower include a second end portion, said actuating element is formed in said second end portion of said depression of said follower.

6. The pivotal supporting system as claimed in claim 5, wherein said follower includes a second actuating member formed in said second end portion of said recess of said follower.

* * * * *